(12) United States Patent
Kuo

(10) Patent No.: US 6,933,678 B2
(45) Date of Patent: Aug. 23, 2005

(54) EMERGENCY LIGHTING FUNCTION ILLUMINATION APPLIANCE

(76) Inventor: Chao-Tung Kuo, 6F. No. 21, Hsin Tung Street, Taipei (TW)

( * ) Notice: Subject to any disclaimer, the term of this patent is extended or adjusted under 35 U.S.C. 154(b) by 40 days.

(21) Appl. No.: 10/731,130

(22) Filed: Dec. 10, 2003

(65) Prior Publication Data

US 2005/0127842 A1 Jun. 16, 2005

(51) Int. Cl.[7] .......................... H05B 37/00; F21V 19/04; H02H 3/00
(52) U.S. Cl. ............................. 315/86; 315/88; 362/20; 361/71
(58) Field of Search .............................. 315/86, 87, 88, 315/291, 362; 362/20; 361/59, 71

(56) References Cited

U.S. PATENT DOCUMENTS 5,859,499 A * 1/1999 McAfee et al. ............... 315/86
6,049,178 A * 4/2000 Sheu et al. .................. 315/291
6,107,744 A * 8/2000 Bavaro et al. ................ 315/86

* cited by examiner

*Primary Examiner*—Tuyet Thi Vo
(74) *Attorney, Agent, or Firm*—Rosenberg, Klein & Lee

(57) ABSTRACT

An emergency lighting function illumination appliance comprised of a fluorescent lamp tube, a controller, a mains power circuit capable of processing mains electric power for lighting, and a backup circuit that provides for a backup power source. With these devices combined, the controller produces the following functions: 1) When mains power is normally supplied, an ON-OFF switch approach controls the fluorescent lamp in accordance with user intent. 2) During a mains power outage, the power circuit is automatically shifted to the backup circuit and the backup power source supplies electricity for emergency lighting. 3) When mains power supply is restored, the power circuit is automatically shifted to the mains power circuit and the mains power resumes the ordinary lighting function.

8 Claims, 5 Drawing Sheets

EMERGENCY LIGHTING FUNCTION ILLUMINATION APPLIANCE

BACKGROUND OF THE INVENTION

1) Field of the Invention

The invention herein relates to emergency lighting equipment, specifically an emergency lighting function illumination appliance that integrates ordinary lighting and emergency lighting into a single piece of equipment.

2) Description of the Prior Art

Conventional emergency lighting equipment is a type of appliance that continues to provide illumination during failures of normal electricity (mains power) distribution with the purpose of maintaining minimal visibility in homes, work places, and shelter passageways to thereby enable a short period of time to conclude work or facilitate evacuation guidance. Evacuation guidance devices includes exit indicator lights over safety doors and various hallway direction signs, their installation allowing identification of evacuation passageways and safety door locations in the dark. As living quality has risen in recent years, building design has in addition to emphasizing comfort also been required to take safety into consideration.

Conventional emergency lighting equipment now available on the market is mainly wall-mounted emergency lighting fixtures. Such emergency lighting is typically installed in several places along hallways, stairs, passageways, and other ordinarily illuminated areas that must be traversed during evacuations. In most cases, the emergency lighting is internally equipped with an AC-DC switching device, to process the mains power (AC source) and output an appropriate DC to automatically charge a backup battery for auto cessation when a full charge is reached. In the event of a power outage, the device automatically switches to a backup circuit which supplies power for emergency illumination.

However, since emergency lighting is designed for stand alone use in various areas, consumers can purchase them individually for indoor installation. Such emergency lighting is only placed along hallways, stairs, passageways, and other ordinarily illuminated areas that must be passed through during evacuations to highlight their locations and, therefore, the illuminated areas are limited and, furthermore, due to their wall-mount design, light is only directed onto walls, which is a further curbs area coverage.

Consequently, lighting equipment, such as fluorescent lamps, in most homes and work places are of a switch-based design, enabling circuit opening and closure for controlling fluorescent operation on and off. As a result, mains power must be supplied before fluorescent lamps can provide illumination. Conversely, conventional emergency lighting operation is the opposite of conventional lighting equipment; illumination is provided when mains power fails and the lighting automatically terminates when normal mains power supply resumes. As such, the applicant of the invention herein thought to provide a new type of lighting equipment, the said equipment utilizing fluorescent lamp tube, light bulb, or light-emitting diode (LED) such that the fluorescent lamp tube, light bulb, or light-emitting diode (LED) typically utilized for ordinary lighting but still retains lighting capability during mains power outages and, therefore, integrated both an ordinary lighting device and a emergency lighting device into one single structural entity. The most difficult part of this integration is how to distinguish power failure from turning off the light by users. Some solutions in the market make use of three wires to control (the circuit layout of the building have to be rearranged), some use remote controller, some use a rope as on/off control. However, non of these solutions are economical and convenient.

SUMMARY OF THE INVENTION

The objective of the invention herein is to provide an emergency lighting function illumination appliance to save the expense of additionally purchasing emergency lighting.

Another objective of the invention herein is to provide an emergency lighting function illumination appliance that has lighting capability when mains power is normally supplied and also during mains power outages.

The present invention integrates an emergency illumination device and ordinary illumination device into one unit. The most attractive part of this invention is that there is no need to modify the circuit layout of the building. Thus, to reduce expenditures, increase lighting area coverage, and facilitate evacuation efficiency.

To further elaborate, under such a concept, the invention herein is utilized on a fluorescent lamp and is comprised a fluorescent lamp tube and a controller, the controller is capable of distinguishing whether mains power is being normally supplied to thereby determine when the fluorescent lamp should be operated by mains power or by a backup power source. Additionally, when mains power is normally supplied, the user turns on or off of the fluorescent lamp with a switch (the special switch generates voltage or current pulse) to thereby achieve user requirements. A mains power circuit (switching ballast) provides for powering the fluorescent lamp when mains power is available and a backup circuit provides for powering the fluorescent lamp by a backup power source during mains power outages.

DETAILED DESCRIPTION OF THE INVENTION

The invention herein utilizes fluorescent lamp technological content, advantages, and functions. To enable a further understanding, a brief description of the drawings is followed by the detailed description of the most preferred embodiment of the invention herein.

When conventional fluorescent lights available on the market normally utilize mains electricity, the user toggles a switch to connect or disconnected fluorescent lamp with power and thereby effectively achieve lamp illumination and vice-versa; however, the design of conventional fluorescent lights is such that they are incapable of distinguishing between a normal power and a power outage situation; to integrate an emergency illumination device and ordinary illumination device into one unit, under normal mains power. The design herein utilizes a special device, the controller of the invention herein, which after processing generates different level signals, to thereby control fluorescent lamp switching using a new method. When electricity is normally supplied by mains power, the lamp, whether in an illuminative state or a non-illuminative state, remains in a state of continuity. The electricity or current passed to the fluorescent lamp won be cut off by switch (except when the switch is pressed). Instead, the switch only generates pulse signals when toggled. To achieve these objectives, the fluorescent lamp power supply switch must ordinarily be maintained in a state of continuity (always ON); when the switch button is pressed, this establishes in a state of discontinuity and, when no longer pressed, switch automatically restores the state of continuity, thereby resulting in instantaneous short power termination; the controller inside the fluorescent lamp which is detecting and processing the said pulse signal enables or disables illumination of the fluorescent lamp as user requires, (an approach that is different from that of conventional switched lamps now on the market). During a mains power outage, the controller automatically shifts the fluorescent lap circuit to the backup circuit, the backup power supply provides electricity to power the fluorescent lamp, which enters the emergency illumination mode, and functions among the features of the invention herein. To elaborate, referring to FIG. 1, wherein State 1 runs during a mains power outage, the controller automatically shifts the fluorescent lamp power supply circuit to the backup circuit backup power source to furnish power for emergency lighting; State 2 is made in such a way that the user enables illumination of the fluorescent lamp, and State 3 is made in such a way that the user disables illumination of the fluorescent lamp. During a mains power outage, whether the fluorescent lamp is originally situated in State 2 or State 3, the equipment of the invention herein automatically shifts the fluorescent lamp power supply circuit to State 1 for emergency lighting.

Figure 2:
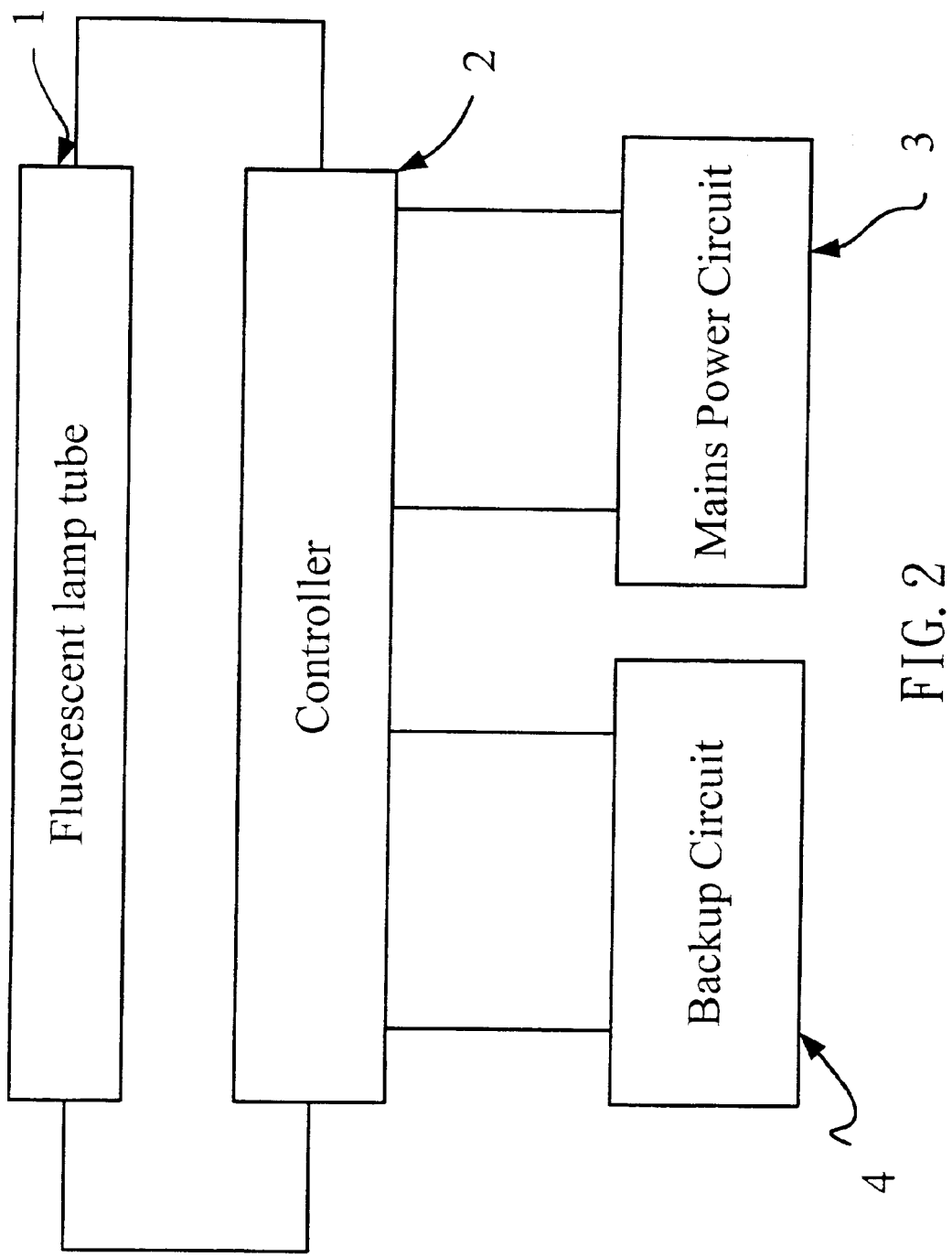
FIG. 2 is a block diagram of the invention herein.

As indicated in FIG. 2, the preferred embodiment emergency lighting function illumination appliance of the invention herein has a fluorescent lamp tube 1, a controller 2, a mains power circuit 3, and a back up circuit 4 such that the fluorescent lamp tube 1 is operated by the controller 2, which selects mains power supplied from the mains power circuit 3 or selects backup power from the backup circuit 4.

Figure 3:
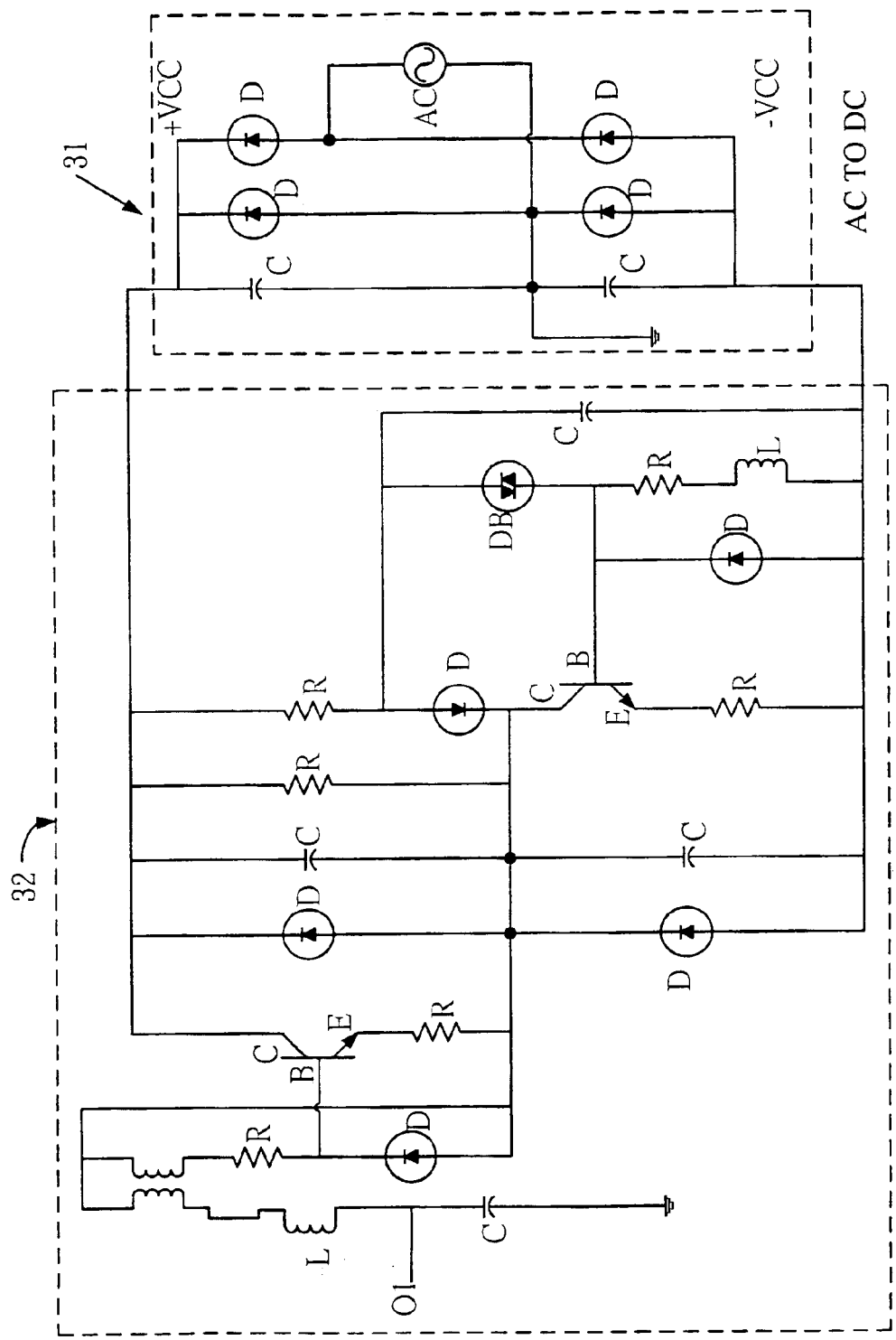
FIG. 3 is a schematic diagram of the mains power circuit 3 in FIG. 2.
Figure 4:
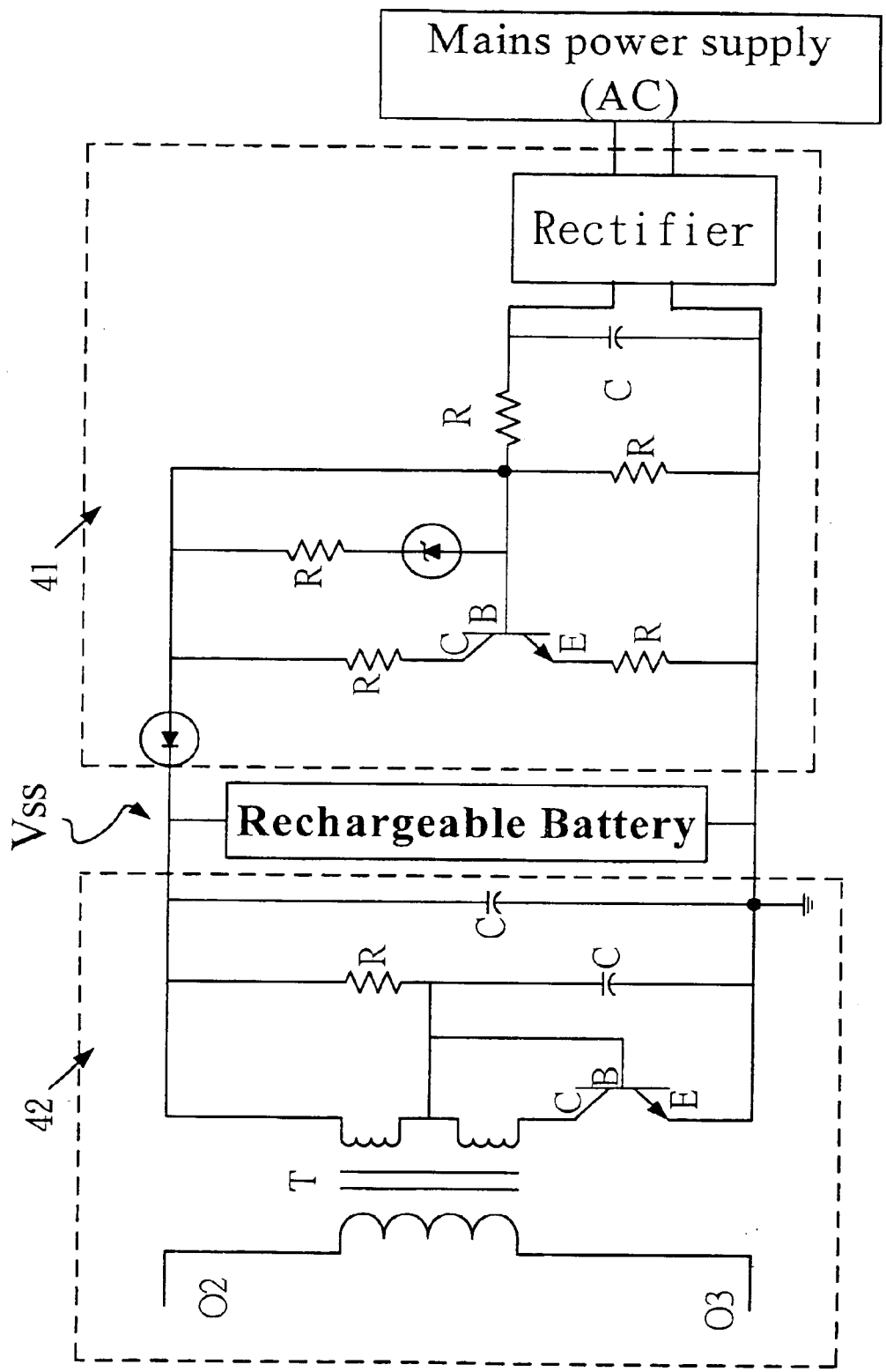
FIG. 4 is a schematic diagram of the backup circuit 4 in FIG. 2.

As indicated in FIG. 3, the mains power circuit 3 is an electric power device that consists of a switching ballast utilized to convert and process mains power appropriately to drive the fluorescent lamp tube 1, an AC-to-DC converter circuit 31, and an oscillator circuit 32. The AC-to-DC converter circuit 31 receives mains power input, converts it into direct current $+V_{CC}$ and $-V_{CC}$ that is outputted to the oscillator circuit 32, the oscillator circuit 32 then converting the direct current electricity into a high frequency signal fed to the fluorescent lamp tube 1, thereby driving the fluorescent lamp tube 1 into luminescence. Similarly, as indicated in FIG. 4, the backup circuit 4 has a direct current oscillator circuit 42, a backup power source, and a charging circuit 41; the backup power source (such as a rechargeable battery, etc.) outputs direct current electricity to the oscillator circuit 42, where it is processed and outputted to the fluorescent lamp tube 1 such that the fluorescent lamp tube 1 is driven into luminescence for emergency lighting. As such, since the fluorescent lamp tube 1, the mains power circuit 3, and the backup circuit 4 are widely known devices and, furthermore, are not improvement focal points of the present invention, they shall not be further elaborated.

Figure 5:
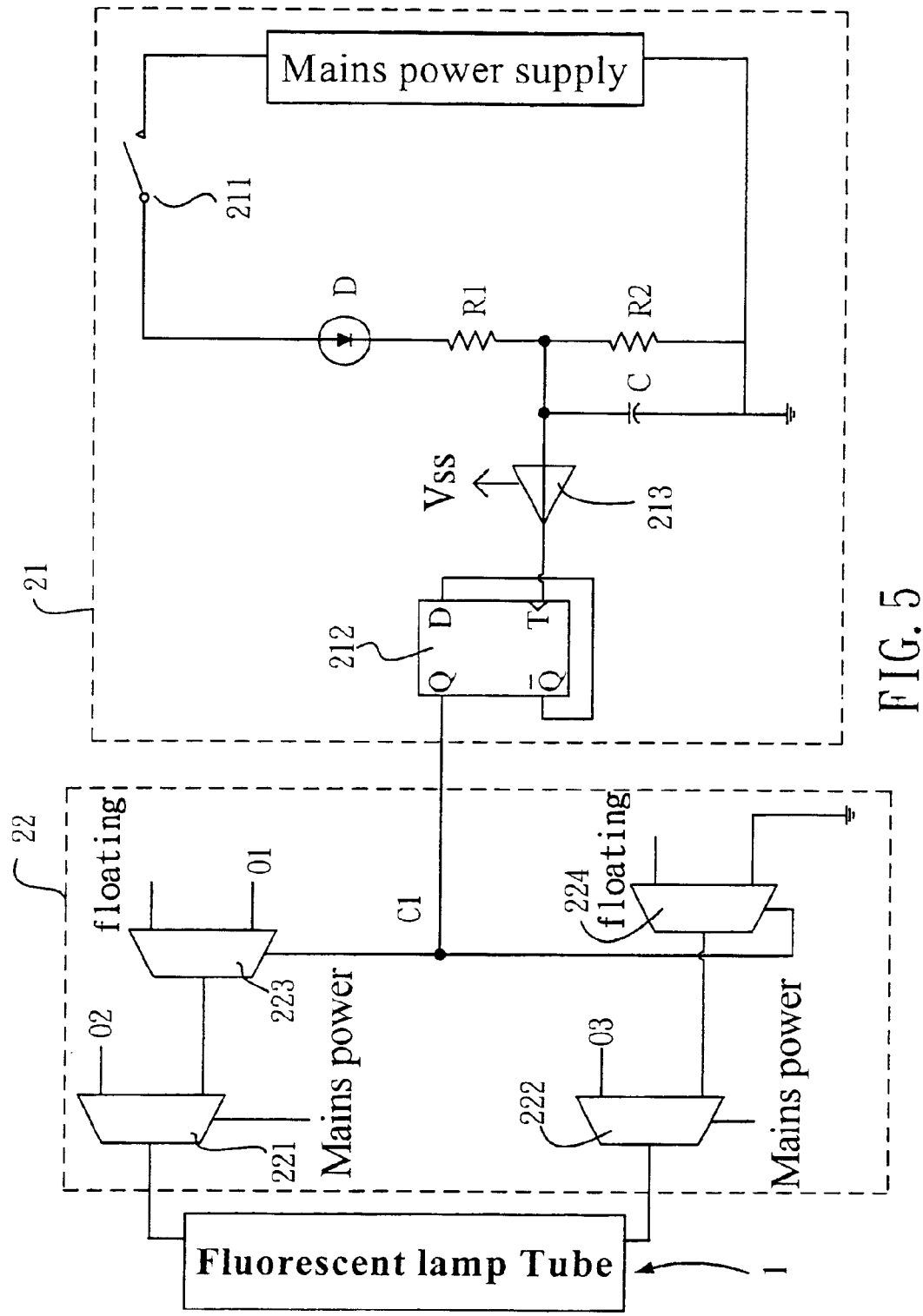
FIG. 5 a schematic diagram of the controller 2 in FIG. 2.

The controller 2 of the invention here is a new type that provides the user control over fluorescent lamp tube 1 luminescence and non-luminescence when mains power is normally supplied and capable of automatically shifting to using the backup circuit 4 backup power source and starting the luminescence of the fluorescent lamp tube 1 during mains power outages. The controller 2 is capable of automatically selecting a shift of the fluorescent lamp tube 1 to the mains power circuit 3, the backup circuit 4, or no connection due to changes in the electricity supply situation or a different selection by the user. As indicated in FIG. 5, the new type controller 2 herein is comprised of a control unit 21 and a selection unit 22. The said control unit 21 outputs signals to the selection unit 22 according to the utilization objectives of the user; as such, the selection unit 22 automatically distinguishes whether mains power is being supplied, and based on the different control signals received, the controller 2 automatically places the fluorescent lamp tube 1 in either State 1, State 2, or State 3, thereby achieving the new type functions and performance.

The control unit 21 outputs different level control signals to the selection unit 22 as the illumination of fluorescent lamp is disable or enable by the user, thereby informing the selection unit 22 of the user selections. For example, when the user enable illumination of the fluorescent lamp, the controller 2 correspondingly outputs a high level control signal; when the user disable illumination of the fluorescent light, the controller 2 correspondingly outputs a low level control signal, causing the fluorescent lamp to go out; as such, the repeated actuation of the switch effectively turns the fluorescent lamp on and off.

In the embodiment herein, the control unit 21 has a switch 211, the switch 211 providing the user an instantaneous pressing means of controlling the fluorescent lamp such that when mains power is normally supplied, the fluorescent lamp can be controlled on and off. The said switch 211 is an always on switch, the switch 211 is ordinarily closed and in a state of continuity, only switching off whenever the switch 211 is pressed, but when the switch 211 is no longer pressed, it automatically returns to the closed state and remains in state of continuity at once; therefore, the new type control unit 21 of the invention herein is also comprised of a D type flip-flop 212, a switch 211, and a Schmitt trigger amplifier 213, its output pin is connected to the trigger pin T of the D type flip-flop 212. The D type flip-flop 212 negative output pin $\overline{Q}$ goes to input pin D. The control signal C1 shown as outputted from the D type flip-flop 212 positive output pin Q; as such, if the control signal C1 is originally a high level signal (logical 1), the negative output pin $\overline{Q}$ and the input pin D signals are now low level signals (logical 0), if the switch 211 button is pressed at this time, then the signal received by the D type flip-flop 212 trigger pin T becomes a low level signal from the original high level signal, and after the switch 211 button is released, the switch immediately returns to a high level signal (a positive edge trigger signal is generated); when the D type flip-flop 212 receives the positive edge signal generated by the switch 211, then the input pin D signal is transferred to the output pins Q and it inverse $\overline{Q}$, at which time the control signal C1 outputted by the positive output pin Q becomes a low level signal (logical 0) and the signal connected to the input pin D becomes a high level signal (logical 1); similarly, after the user once again presses the switch 211 and immediately releases it, a positive edge signal is generated again, causing the D type flip-flop 212 to once more transfer the input pin D high level signal to the output pins Q and it inverse $\overline{Q}$. Therefore, the control signal C1 outputted by the output pin Q again becoming a high level signal (logical 1). Consequently, the user repeatedly presses/releases the control unit switch 211 to sequentially output different level signals to the selection unit 22 and, as such, effectively achieves control over the illumination and non-illumination of the fluorescent lamp. It should be noted that although the switch 211 of the embodiment herein is an always on switch, those skilled in the technology can utilize other categories of switches available on the market such as rotary-type switches and prod-type switches, etc. A mere control unit 21 is capable of processing the generated pulse signal and outputting different level control signals, which enable and disable illumination of fluorescent lamp as the user wishes, and shall not be limited by the disclosed objectives herein.

Those familiar with digital circuit design know that the said D type flip-flop 212 circuit can be substituted with other type flip-flop mechanisms such as T type flip-flop; a major aspect of the invention herein is the use of voltage or current pulse signal variation via special processing methods to switch the light source on and off, with the emergency lighting equipment and the ordinary lighting equipment integrated into a single entity; although other circuits can be used as substitutes for the control unit 21 circuit, all utilize voltage or current pulse signal variation to serve as a means of switching the light source on and off, and, the design for the integration of the ordinary lighting device and the emergency lighting device into a single entity shall also be included in the claims of the invention herein.

Figure 1:
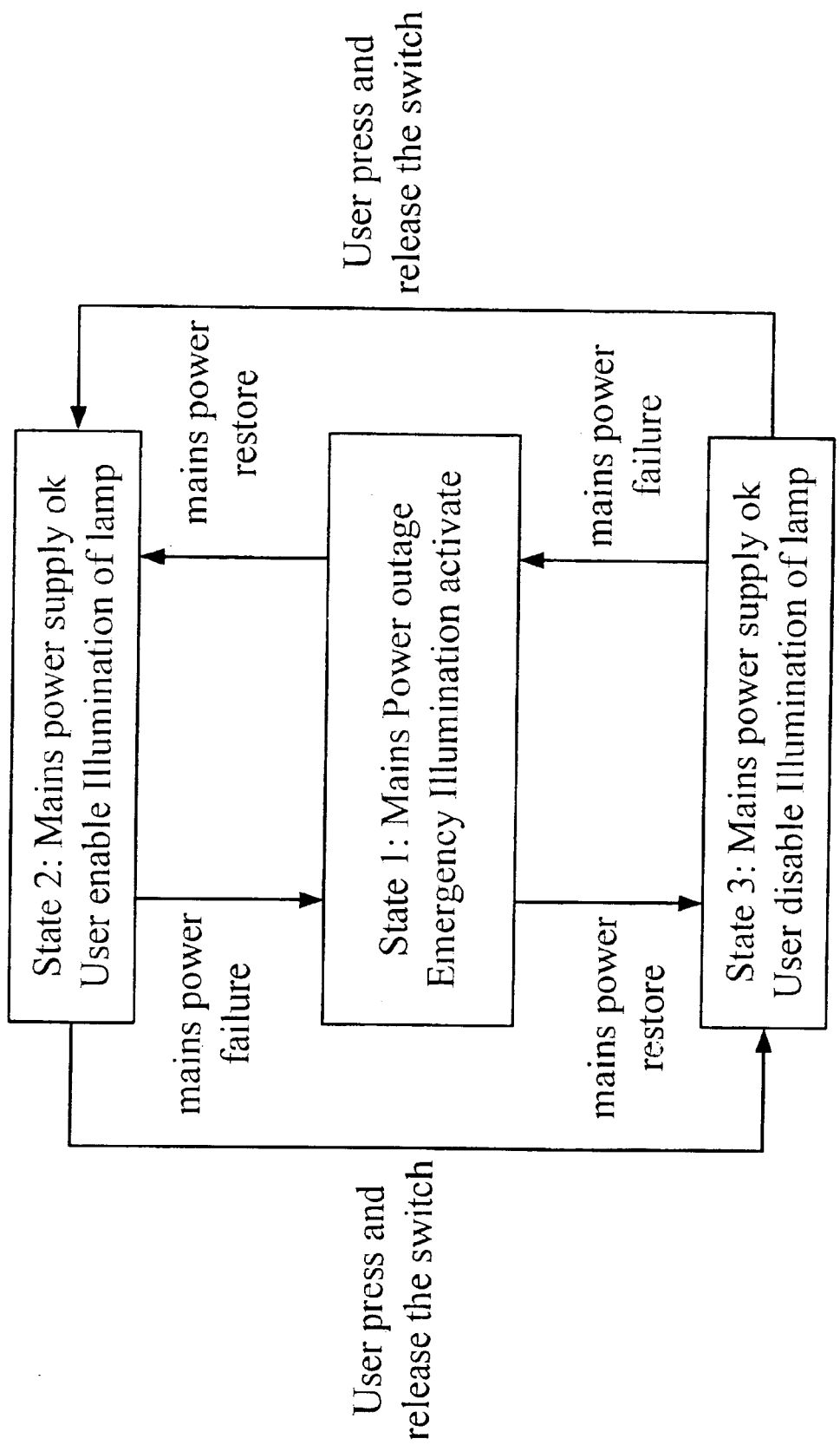
FIG. 1 is a state chart of the most preferred embodiment of the invention herein.

Additionally, to facilitate further description, first assume that when the control signal C1 is a high level signal, then this represents that the user wants to enable illumination of the fluorescent lamp (as shown in State 2 of FIG. 1), and when the control signal C1 is a low level signal, then this represents that the user wants to disable illumination of the fluorescent lamp (as shown in State 3 of FIG. 1).

The selection unit 22 determines whether the fluorescent lamp tube 1 is connected to the mains power circuit 3, the backup circuit 4, or totally unconnected based on the control signal C1 (as shown in FIG. 5) or mains power is present/not present, enabling the fluorescent lamp to alternate through States 1, 2, and 3, as indicated in FIG. 1 to achieve the objectives of ordinary lighting or emergency lighting. To elaborate, during a mains power outage, the fluorescent lamp tube 1 circuit is automatically shifted via the selection unit 22 to the backup circuit 4, the power supplied by the backup power source effectively producing emergency lighting (as shown in State 1 of FIG. 1); when mains power is restored to normal, the fluorescent lamp tube 1 circuit is automatically shifted via the selection unit 22 to the mains power circuit 3; when the mains power is normally supplied and, furthermore, the user wants to disable illumination of the fluorescent lamp, the fluorescent lamp tube 1 is controlled by the selection unit 22 and is not connected to either the mains power circuit 3 or the backup circuit 4, which remains non-illuminative because no electricity is supplied (as shown in State 3 of FIG. 1). The selection unit 22 embodiment herein has four relays 221, 222, 223, and 224. These relays have two input pins, one output pin, and a selection pin. The output pins of relays 221 and 222 are respectively connected to the two input ends of the fluorescent lamp tube 1, the upper right side input pins of the two relays 221 and 222 are respectively connected to the output pins O2 and O3 of the backup circuit 4 (as shown in FIG. 4 and FIG. 5), and the input pins at the lower right side of the relays 221 and 222 are respectively connected to the output pins at the left side of the relays 223 and 224. The input pins at the lower right side of the relays 223 and 224 are respectively connected to output pin O1 and the ground of the mains power circuit 3 (as shown in FIG. 3 and FIG. 5), the other input pins at the upper right side are left floating. Additionally, the selection pins at the lower sides of relays 221 and 222 are respectively connected to mains power. When mains power is normally supplied, the relays 221 and 222 output pins are connected to the lower right side input pins. Via the relays 223 and 224, power is supplied from the mains power circuit 3 or not determined by the control signal C1 (C1 is controlled by the user). During power outages, the relays 221 and 222 output pins are connected to O2 and O3 of FIG. 4 at the upper right side input pins, enabling the illumination of the fluorescent lamp tube 1 by the backup power source of backup circuit 4. The selection pins at the lower side extent of relays 223 and 224 are connected to the control signal C1 (driven by the output pin Q of D type flip-flop 212). When the control signal C1 is a high level signal, the relays 223 and 224 output pins are respectively connected to the input pins at the lower right side, enabling connection of the input pins at the lower right side of the relays 221 and 222 via the relays 223 and 224 to both the output pin O1 and ground of the mains power circuit 3, and the fluorescent lamp tube 1 is powered by mains power (as shown in State 2 of FIG. 1); and when the control signal C1 is a low level signal, the relays 223 and 224 output pins are connected to the input pins at the upper right side, the fluorescent lamp remaining non-illuminative because no power is supplied (as shown in State 3 of FIG. 1).

Based on the said structural components and their interrelationship, the toggling states of the fluorescent lamp are further elaborated. First, if mains power is normally supplied, then the relays 221 and 222 output terminals are automatically connected to input pins at the lower right side, following which the other two relays 223 and 224, based on the control signal C1 received, determine whether the fluorescent lamp tube 1 is illuminative or not. When the user wants enable illumination of the fluorescent lamp, the user presses and release the switch 211, the control unit 21 outputs a high level control signal C1, causing the relays 223 and 224 output pins to connect with both the input pin O1 and the ground at the lower right side, enabling the fluorescent lamp tube 1 via the relays 221, 222, 223, and 224 to become connected with the mains power circuit 3 output pins O1 and ground, and enter State 2 indicated in FIG. 1 to thereby switch on, at which time, if the user wants to disable illumination of the fluorescent lamp, the user presses and release the switch 211, the control signal C1 outputted by the control unit 21 becomes a low level signal, toggling the relays 223 and 224 output pins into connection with the input pins at the upper right side such that the fluorescent lamp tube 1 is disconnected from the mains power circuit 3, switching it off because power is no longer supplied (as shown in State 3 of FIG. 1). Consequently, under situations in which mains power is normally supplied, the user momentarily presses the switch 211 several times to control the fluorescent lamp, with the toggling on and off of the fluorescent lamp shown in transition between State 2 and State 3 of FIG. 1. In the event of a mains power outage (power failure), then the relays 221 and 222 output pins are automatically toggled into connection with the backup circuit 4 output pins O2 and O3 at the upper right side and, as such, the backup circuit 4 is connected to the fluorescent lamp tube 1 via the relays 221 and 222 left side output terminals and supplied electricity by the backup power source of backup circuit 4, the fluorescent lamp entering the emergency lighting mode as shown in state 1 of FIG. 1.

Based on the foregoing section, the fluorescent lamp of the invention herein ordinarily (when mains power is normally supplied) serves as lighting equipment for user operation and usage, but during power outages, due to the function of the controller 2 selection unit 22 and the backup circuit 4, automatically serves as emergency lighting; as such, the user does not have to purchase emergency lighting equipment to effectively save cost and, furthermore, because the illumination range and the applications scope of the fluorescent lamp is large.

Additionally, although the said embodiment only discloses an illumination appliance having an emergency light function, those skilled in the technology are knowledgeable that the controller 2 and the backup circuit 4 can be integrated into a unitary control device and utilized in existent fluorescent lamps, or the controller 2, the mains power circuit 3, and the backup circuit 4 combined into a single device for utilization in fluorescent lamps; the controller 2 uses four relays, but actually when the controller 2 is integrated with the mains power circuit 3 and the backup circuit 4, the quantity of relays are reduced and, therefore, the said embodiment as described shall not be construed as a limitation on the invention herein; additionally, the main application of the embodiment herein consists of fluorescent lamps and since fluorescent lamp photoelectric transformation efficacy is outstanding, the structure of the invention herein can be modified and still achieve the same objectives, wherein the general approaches are as follows:

First, if the fluorescent lamp tube 1 is still utilized and the mains power circuit 3 (switching ballast) is changed to a conventional ballast; when utilizing this arrangement, a starter is added to the fluorescent lamp tube 1 power input pin.

Second, if the fluorescent lamp tube 1 is changed to a different type of light bulb or other illuminant such as an LED, then a) the mains power circuit 3 is replaced by a transformer and rectifier, electricity is then supplied from mains power via the transformer and then via a rectifier; and b) the direct current oscillator circuit 42 in the backup circuit 4 is eliminated, then the illuminant appliance can be directly driven by the backup power source such as a rechargeable battery, enabling the controller 2 to function identically.

Third, when the switching ballast is built in the fluorescent lamp tube 1, as a product which can be bought in the market. The oscillator circuit 42 of the backup circuit 4 can be modified to generate a switching power like AC source (eg. the voltage and frequency are equivalent to the mains power source), and the switching ballast in the mains power circuit 3 can be removed, Therefore the controller 2 of the invention herein can also achieved the same function.

However, in the preceding description, the most preferred embodiment of the invention herein is provided as an example and shall not be construed as a limitation on the claims of the present invention, the said embodiment utilizing power interrupters, ON-OFF power switches, or other approaches to generate voltage or current pulse signals, such that after processing by the controller 2, the special device of the invention herein described above, the following functions are achieved: a) The illumination appliance is turned on and off through a power switch ON-OFF approach based on user intent when mains power is normally supplied; b) During mains power outages, the power circuit is automatically shifted to the backup circuit and supplied power from the backup power source and thus effectively produces emergency lighting; and c) When mains power electricity supply is restored, the power circuit is automatically shifted to the mains circuit, with the mains power supply of electricity restoring ordinary lighting function. All simple modifications and adaptation based on the said descriptive content of the invention herein shall remain protected by the patented claims of the present invention.

What is claimed is:
1. An emergency lighting function illumination appliance comprised of:
an illumination appliance;
a mains power circuit that receives mains power and processes the said mains power appropriately to drive the said illumination appliance;
a backup circuit that processes a backup power source (a rechargeable battery) is capable of driving the said illumination appliance;
a controller connected between the said illumination appliance and both the said mains power circuit and said backup circuit, the said controller comprised of a control unit and a selection unit. The said control unit having a switch and when the said switch is momentarily pressed and released, the said control unit outputs different level control signal, and the said selection unit, based on the presence or absence of mains power, determines whether the circuit of the said illumination appliance is connected to either the said backup circuit or the said mains power circuit; the said selection unit has four relays, each said relay has two input pins, one selection pin, and one output pin, wherein the said output pins of the said first and second relays are respectively connected to the two input pins of the said illumination appliance, one said input pin is respectively connected to the output pin of the said backup circuit, the other said input pin is connected to the said output pins of the said third and fourth relays, the said input pins of the said third and fourth relays are respectively connected to the two output pins of the said mains power circuit and, furthermore, the said selection pins of the said first and second relay are connected to the said mains power and when mains power is being supplied, the said output pins of the said first and second relays are connected with the said output pins of the said third and fourth relays that are connected to the said input pins, and during mains power outages, the said output pins of the said first and second relays are connected with the said backup circuit output pins that are connected to the said input pins, thereby enabling the said backup circuit backup power source to supply power to the said illumination appliance; when mains power is normally supplied and the said selection pins of the said third and fourth relays receive control signals outputted from the said control unit, and the said control signal is of a high level, the said output pins of the said third and fourth relays are connected to the said two output pins of the mains power circuit and thereby input the said mains power; when the said control signal is of a low level, the said output pins of the said third and fourth relays are toggled into connection with the other said input pin and no power is inputted; when the said mains power fails, the said controller connects the said illumination appliance to the said backup circuit such that it receives the said backup power source for emergency lighting, and when the said mains power is normally supplied, the said controller, based on user purposes, controls the said illumination appliance to accept power processed by the said mains power circuit to thereby switch it on or not accept any power to thereby leave it switched off.

2. As mentioned in claim 1 of the emergency lighting function illumination appliance of the invention herein, the said control unit switch is an always on switch and the said control unit has a D type flip-flop that is utilized to output the said control signals to the said selection unit.

3. As mentioned in claim 1 of the emergency lighting function illumination appliance of the invention herein, the said control unit has an Smith trigger amplifier connected between the said switch and the said D type flip-flop.

4. As mentioned in claim 1 of the emergency lighting function illumination appliance of the invention herein, the said mains power circuit is comprised of an AC-to-DC converter circuit that receives the said mains power and an oscillator circuit between the said AC-to-DC converter circuit and the said control unit.

5. As mentioned in claim 1 of the emergency lighting function illumination appliance of the invention herein, the said battery of the said backup circuit is a rechargeable battery.

6. As mentioned in claim 1 of the emergency lighting function illumination appliance of the invention herein, the said backup circuit is also comprised of a direct current oscillator circuit and a charging circuit between the said battery and the said controller.

7. As mentioned in claim 1 of the emergency lighting function illumination appliance of the invention herein, the said mains power circuit is a conventional ballast device and a starter is added to the said fluorescent lamp tube power input pin.

8. As mentioned in claim 1 of the emergency lighting function illumination appliance of the invention herein, the said illumination appliance is a low-voltage light bulb or an light-emitting diode (LED), a transformer receives mains power and processes the said mains power appropriately and later outputs it to drive the said illumination appliance. The backup circuit can include a rechargeable battery, a backup circuit capable of outputting the appropriate power to drive the said illumination appliance, and the said controller is connected among the said illumination appliance, the said transformer and the said backup circuit.

* * * * *